Nov. 7, 1967  T. I. BURENGA  3,351,200
SCREEN CLEANING APPARATUS
Filed May 25, 1965  3 Sheets-Sheet 1

INVENTOR
THOMAS I. BURENGA
BY Hans G. Hoffmeister
ATTORNEY

Nov. 7, 1967
T. I. BURENGA
3,351,200
SCREEN CLEANING APPARATUS
Filed May 25, 1965
3 Sheets-Sheet 2
FIG_2
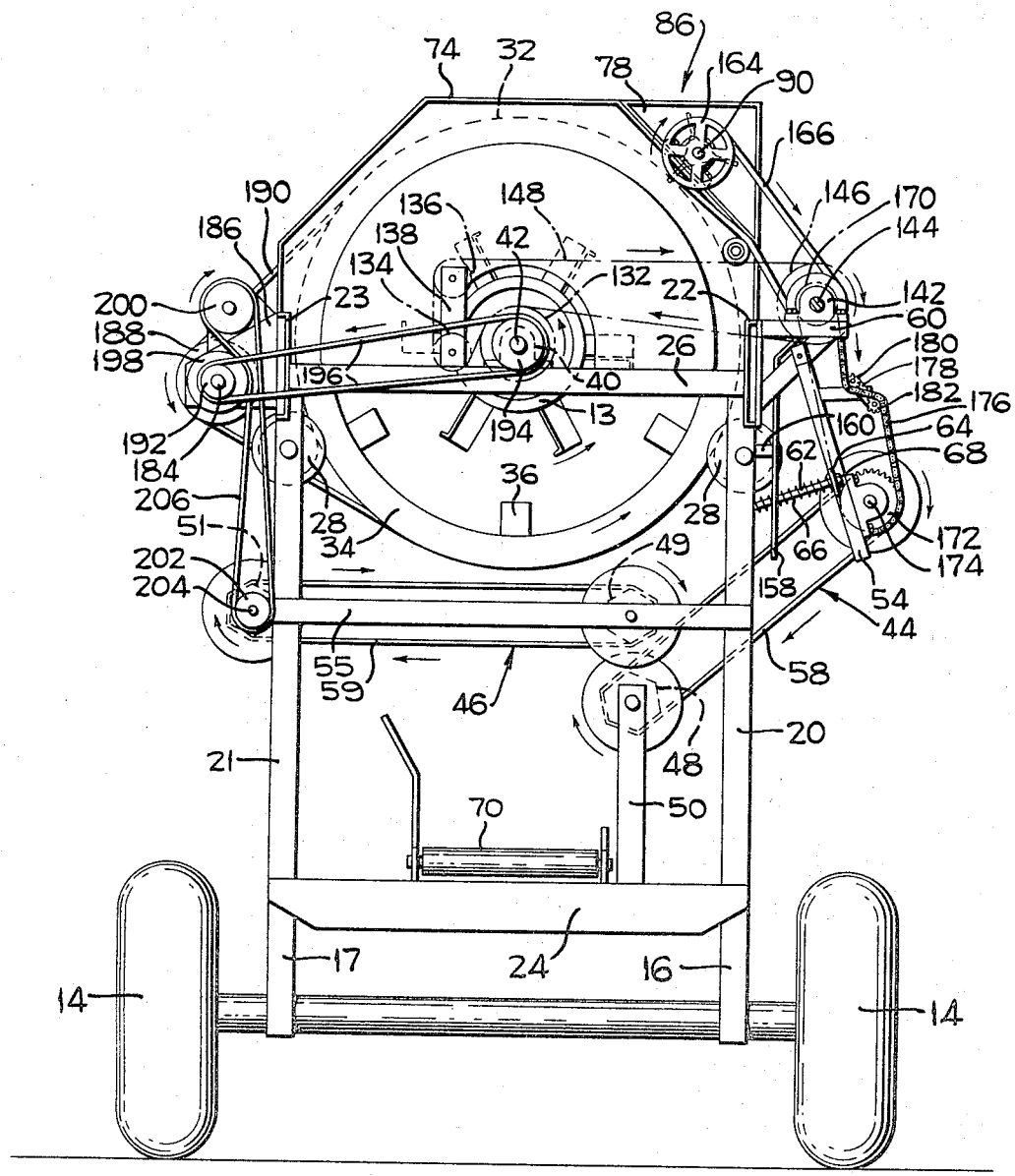
INVENTOR
THOMAS I. BURENGA
BY Hans G. Hoffmeister.
ATTORNEY

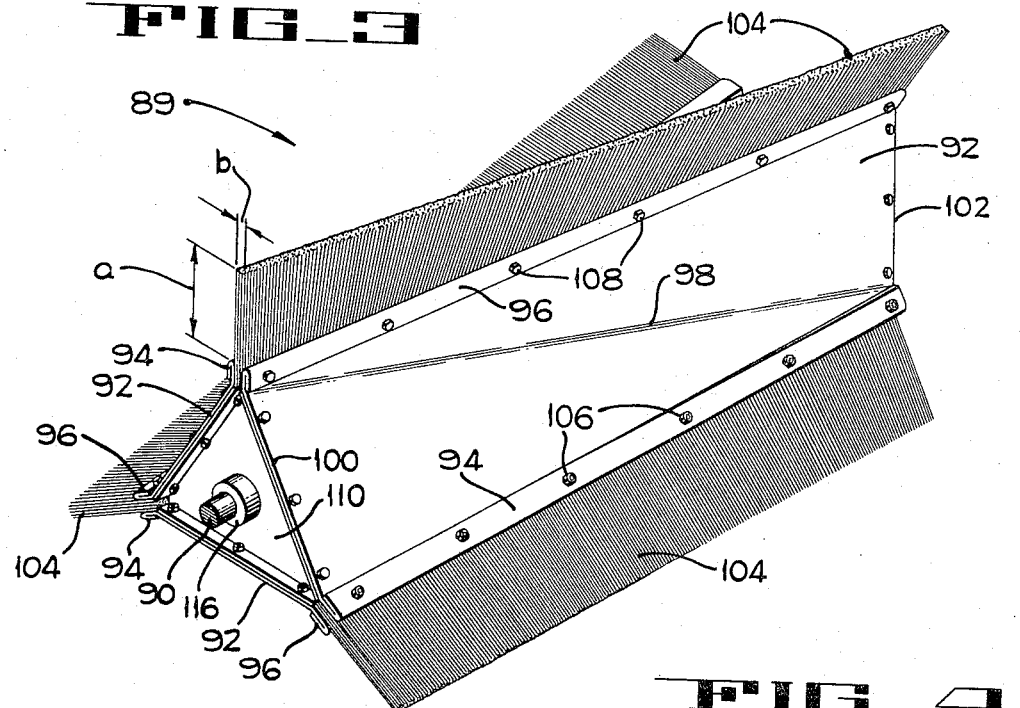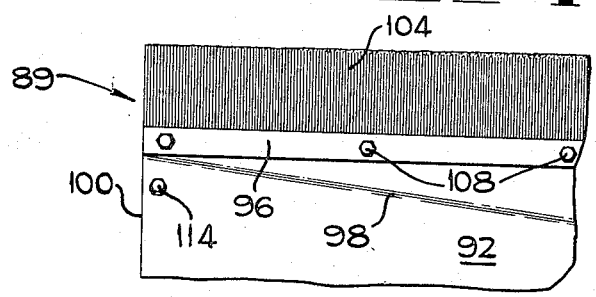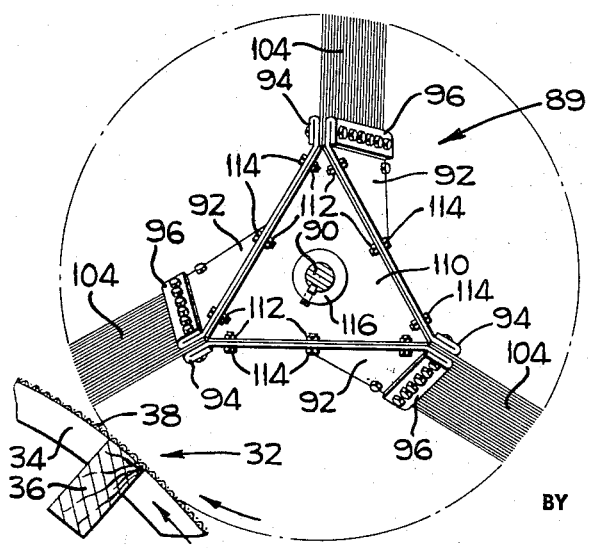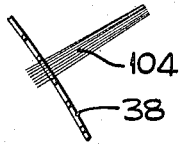

United States Patent Office 3,351,200
Patented Nov. 7, 1967

3,351,200
SCREEN CLEANING APPARATUS
Thomas I. Burenga, Lansing, Mich., assignor to FMC Corporation, San Jose, Calif., a corporation of Delaware
Filed May 25, 1965, Ser. No. 458,633
3 Claims. (Cl. 209—299)

ABSTRACT OF THE DISCLOSURE

A lentil harvesting drum screen is cleaned by a rotary brush having circumferentially spaced, slightly helical rows of relatively stiff bristles. The width of the bristles in a row is less than that of the screen openings.

---

The present invention relates to a screen cleaning apparatus and more particularly to a rotary screen cleaning apparatus for a harvester for separating peas, beans, and the like from pods or hulls grown on vines.

The present invention is particularly suited for use on a harvester, although it is not limited thereto as the subsequent description will reveal. One harvester, or as commonly known, a viner, of the type to which the present invention is applicable is fully described and illustrated in the Carmichael et al. Patent No. 3,087,499, issued Apr. 30, 1963 to the same assignee as the present invention. The viner illustrated in the Carmichael et al. patent operates on an impact principle. Vines with attached pods or hulls are fed into one end of a large rotating perforated-screen covered drum. A series of longitudinally extending beater beams are mounted within the screen covered drum, and a beater is rotatably mounted coaxially within the drum. The vines and the pods or hulls attached to the vines are tossed about and struck by the rotating beams and beater and the pods or hulls are burst open by impact. The edible crop particles, such as, for example, peas or beans, are thus freed from their encasing pods or hulls. The freed edible crop particles and smaller particles of hulls, pods, or vines, termed debris, pass through the perforations of the drum screen and thence downwardly to a separating means where the edible crop particles are separated from the debris particles.

It has been been found, however, that moist debris, such as vine particles, ruptured peas or beans, or hull particles have a tendency to build up on the screen and clog the perforations of the screen during continued operation. In order to provide for continuous operation of the viner, it is highly desirable that some means be furnished for keeping the perforations of the screen drum open and for cleaning accumulated debris from the screen drum as rapidly as it is deposited thereon.

The screen cleaning means of the present invention is particularly effective when used in combination with a perforated drum screen formed of interwoven strings of the type described and illustrated in the above referenced Carmichael et al. patent.

It is an object of the present invention to provide an improved screen cleaning apparatus.

Another object is to provide an improved means for cleaning a screen drum of an agricultural produce harvester.

Another object is to provide an improved cleaning means for a perforated drum of a vine crop harvester.

Another object is to provide an improved means for preventing accumulating of debris on a screen drum of a viner.

Another object is to provide an improved means for removing debris from the perforations of a screen drum of a viner.

These and other objects and advantages of the present invention will become apparent from the ensuing description when read in conjunction with the accompanying drawings in which:

FIGURE 2 is an enlarged end elevation looking in the direction of FIGURE 1.

FIGURE 3 is a diagrammatic perspective of a screen cleaner of the present invention.

FIGURE 4 is an enlarged fragmentary elevation of a portion of the screen cleaner of FIGURE 3.

FIGURE 5 is an enlarged fragmentary vertical section taken of FIGURE 1.

FIGURE 6 is a fragmentary diagrammatic view of the operation of a portion of the screen cleaner means and screen drum of FIG. 5.

Figure 1:
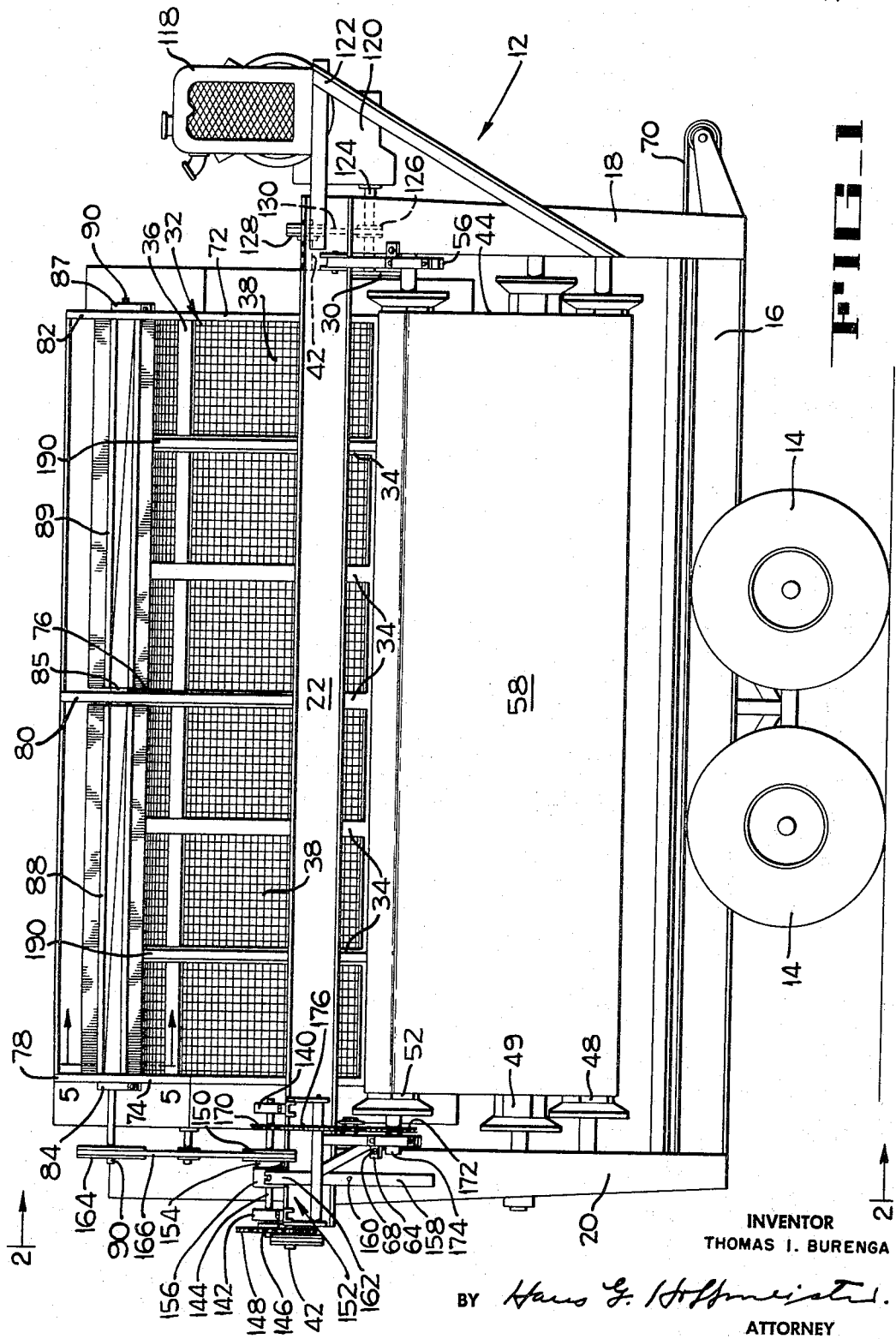
FIGURE 1 is a side elevation of a harvester including a screen cleaner embodying the present invention.

Referring now to FIGURE 1, there a viner 12 is shown mounted for earth traversing movement upon a set of traction wheels 14. The viner 12 includes a pair of horizontal lower frame members 16 and 17, the front ends (right hand end in FIGURE 1) of which may also support a vine pickup mechanism (not shown) and a suitable tractor attachment member (not shown).

Upstanding forward support members 18 (only one of which is shown) are secured to the forward end of each frame member 16 and 17. Upstanding rearward support members 20 and 21 are secured to the rearward ends of the respective horizontal members 16 and 17. The upstanding support members 18 and 20 form a pair on the right hand side of the harvester and are interconnected at their upper end portions by means of an upper longitudinal beam or frame member 22. Likewise, the support members 18 and 21 form a pair on the left hand side of the harvester and are interconnected by an upper longitudinal beam 23. The lower portions of rear support members 20 and 21 are interconnected by a lower transverse beam 24 and the upper ends of the support members 20 and 21 are interconnected by an upper transverse beam 26. Transverse beams (not shown) likewise interconnect the upper and lower portions of the forward support members 18.

On the forward side of each rear support member 20 and 21, flanged screen-drum support wheels 28 are mounted for rotation about a horizontal axis extending in the longitudinal direction of the viner as shown in FIGURE 2. Likewise, another pair of flanged screen-drum support wheels 30 are rotatably disposed on the forward support members 18 in the same horizontal plane as the rear support wheels 28. Only one wheel 30 is illustrated in FIGURE 1.

A large perforated screen drum 32, which is more fully described and illustrated in the aforesaid Carmichael et al. patent, is mounted on the flanged wheels 28 and 30 with its longitudinal axis extending lengthwise of the viner and horizontally therewith. The drum 32 comprises basically a series of circular axially-spaced support members 34 rigidly interconnected by a series of circumferentially spaced longitudinally extending beams 36. The circular support members 34 and beams 36 thus form a cylindrical-shaped drum frame having a series of relatively large peripheral openings over each of which is secured a perforated cover 38. The perforated covers 38 may be, for example, a nylon netting comprised of interwoven threads or strings which form a large plurality of relatively small openings just large enough, or expandible to be large enough, to pass the desired edible crop, such as peas, beans, and the like.

A cylindrical beater 13 is coaxially and rotatably disposed within the interior of screen drum 32. The beater is journalled on a bearing (not shown) suitably disposed on the front upper transverse beam and on a bearing 40 disposed on the upper rear transverse beam 26. A beater drive shaft 42 extends rearwardly through the bearing 40 and has secured thereto a sprocket 132 for driving the screen cleaning means as described more fully hereinafter.

An inclined separating apron 44 is disposed beneath the screen drum 32, on the right side of the viner. The apron 44 includes a lower longitudinally extending six-sided narrow drum 48 rotatably journalled on upstanding support members 50 (only one of which is shown in FIG. 2), and an upper longitudinally extending six-sided narrow drum 52 rotatably journalled on a rear pivot arm 54 and a forward pivot arm 56. A wide flexible belt or web 58 is trained about each of the drums 48 and 52.

The upper end of the rear pivot arm 54 (as viewed in FIG. 2) is pivotally attached to a support bracket 60 which extends outward from the rear support member 20. The arm 54 is thus free to swing in an arc about a horizontal axis extending longitudinally of the viner. A threaded rod 62 is secured to the support member 20 and extends generally outward toward the lower end of pivot arm 54 and passes through a hole provided in a tab 64 secured to the rear side of the arm 54. A compression spring 66 is disposed about the rod 62 and between the member 20 and tab 64. The force of the spring 66 is chosen so as to bias the pivot arm 54 and the attached rear end of right hand drum 54 outwardly away from the viner thereby placing tension on the belt 58. An adjusting nut 68 is threaded over the outer end of rod 62 in order to prevent undue tension from being placed on the belt 58 and to prevent the pivot arm from being jolted too far outwardly of the viner during operation thereof.

Forward pivot arm 56 is pivotally mounted at its upper end to the right hand forward support member 18 in a manner like that described for arm 54. The forward end of the drum 52 is journalled on the lower end of arm 56. Likewise a compression spring and mounting rod, tab, and adjusting nut are provided (not illustrated) for biasing the forward end of the drum 52 outwardly in order to provide tension at the forward end of the right hand belt 58 thereby assuring that the inclined upper surface or run of the belt is maintained substantially smooth.

A drive sprocket 172 is attached to the rear end of drum 54 for connection with the motive power train as described more fully hereinafter.

A horizontal feeding apron 46 is disposed beneath the screen drum 32. The apron 46 includes inner and outer longitudinally extending six-sided narrow drums 49 and 51 rotatably journalled on horizontal support members 55 (only one of which is shown in FIG. 2). The inner drum 49 is spaced directly above the drum 48. A wide flexible belt or web 59 is trained about drums 49 and 51. A drive pulley 202 is attached to one end of drum 51 for connection with the power train as described hereinafter.

The power train drives sprocket 172 and pulley 202 in the clockwise direction so that the upper run or surface of the belt 58 is moved continuously upward and the upper run of belt 59 is moved continuously to the right toward the apron 44 as viewed in FIGURE 2.

The small particles including desired edible crop such as peas, and undesirable debris such as hull or stalk particles drop through the perforated cover 38 of the drum onto the inclined upwardly moving upper surfaces of the belt 58 and the horizontal upper surface of belt 59.

The edible crop and debris matter collected on the upper surface of belt 59 are conveyed to the right and dropped on the upper surface of belt 58 near its lower end. The inclination of the upper surface of the belt 58 is such that the relatively round edible crop, such as peas, will roll downwardly and the undesired debris matter, being of a configuration not easily rollable, will be carried with the upwardly moving upper surface of belt 59 and over the top whereupon they are discharged onto the ground.

Disposed beneath the lower drum 48 is a crop collecting conveyor 70 onto which the desired edible particles from the inclined belt 58 fall and are then carried to a suitable collecting means (not shown). Since the details of the collecting conveyor are not germane to the present invention no further description of it will be given.

Near the forward and rearward ends of the screen drum 32 are cover mounting frames 72 and 74 respectively. In addition a third cover mounting frame 76 is disposed midway between the forward and rear cover mounting frames 72 and 74. Each cover mounting frame is in the general shaped like an inverted U extending from one side of the drum 32 to the other side over the upper half thereof as illustrated in FIGURE 2 with reference to the rear cover mounting frame 72.

Sheet metal members (not illustrated) may be removably attached to the cover mounting frames to thereby enclose the upper half of the drum 32 during operation.

A bearing 84 is mounted on the right hand inclined portion 78 of frame 74. Likewise, bearing 85 and 87 are mounted on the corresponding right hand inclined portions 80 and 82 of respective frames 76 and 72.

A significant feature of the present invention is a screen cleaner 86 for cleaning or prodding of debris from the perforations of the screen drum 32. The cleaner is mounted for rotation about an axis extending longitudinally of the viner as clearly illustrated in FIGURES 1 and 2 and includes two identical rotors 88 and 89 disposed longitudinally on a drive shaft 90.

The details of forward rotor 89 is best illustrated in FIGURES 3, 4 and 5 to which reference is now made. The rotor 89 includes three identical body members or plates 92. Each plate is initially a flat rectangular relatively stiff sheet of metal. A small strip or band of the longitudinal outer portions are bent over 180° so that there is thus formed double thickness longitudinal edges 94 and 96. Each longitudinal edge 94 and 96 is then bent upward so as to be inclined at an angle of approximately thirty degrees with the plane of the plate as viewed in FIGURE 5. The plate is then bent along a diagonal 98 by an acute angle of approximately forty degrees. In this manner the double-thick longitudinal edges 94 and 96 no longer extend parallel to each other but rather are skewed with respect to each other. In addition, end edges 100 and 102 extending between the longitudinal edges 94 and 96 are also in non-parallel relation to each other.

The three bent plates 92 are assembled in generally triangular formation with adjacent longitudinal edges 94 and 96 in spaced parallel relation to each other, as clearly shown in FIGURES 3 and 5. Between each pair of adjacent edges 94 and 96 there is disposed a row of relatively stiff bristles or bristle-like prod elements 104 which extend outwardly from the end edges 94 and 96 by a predetermined distance. Each pair of adjacent longitudinal edges 94 and 96 are drawn firmly toward each other by bolts 108 extending through the edges and nuts 106 on the bolts in order to clamp the inner or proximal ends of the bristles therebetween.

One embodiment of the screen cleaner 86 uses a plurality of bristles formed of polypropylene, each bristle having a diameter of substantially 0.035 inch. Each bristle of a row extends outwardly from the edges 94 and 96 by a distance "$a$" which is approximately 4 inches. The number of bristles secured between the parallel pair of edges 94 and 96 is sufficient to form a row having a thickness "$b$" of approximately one quarter of one inch when measured at the mounting of the bristles. As shown in FIGURE 6, the thickness of the row of bristles 104 when measured at the mounting (dimension $b$, FIGURE 3) is less than the corresponding dimension of the individual openings of the screen 38. Although this particular embodiment has been described to show one way of successfully carrying out the invention, it is to be understood that the invention is not limited to these particular details of construction.

As viewed in FIG. 5, each end of the rotor 89 is in the shape of an equilateral triangle having bristles 104 projecting outwardly from each corner in a straight line extending through the corners and the center of the triangle. However, the two triangles described by the opposite ends of the rotor are angularly displaced with respect to each other about the longitudinal axis extending between the centers of the triangles, as can be seen in FIGURE 5. The exact purpose of the twisted configuration will be more fully described hereinafter.

In order to rotatably mount the rotor 89 in operative relation to the screen drum 32, triangular mounting plates 110 (FIG. 5) having the same equilateral shape as the aforementioned ends of plates 92 are disposed within these ends. The mounting plates are secured to the assembled plates 92 by a plurality of nuts 112 and bolts 114. A hole is provided in the center of each mounting plate 110, and a shaft mounting collar 116 is secured on the outside of the mounting plate 110 at the center thereof adjacent the central hole.

The rearward rotor 88 is identical in construction to rotor 89 and hence need not be further described.

The drive shaft 90, which is long enough to carry both of the rotors 88 and 89, is inserted through the central openings of the collars 116 and through the bearings 84, 85 and 87 mounted on the inclined portions 78, 80 and 82 of respective mounting frames 74, 76 and 72. The two rotors 88 and 89 are thus rotatably mounted in axial alignment, their common axis extending parallel with the axis of the screen drum 32. As indicated in FIGURE 5, the drum 32 is rotated in a counterclockwise direction and the rotors 88 and 89 are driven in a clockwise direction by driving connections fully described below.

The length of the bristles 104 on each of the rotors 88 and 89 is of a predetermined length so that during rotation thereof, the imaginary cylindrical surface described by the rotating outer or distal ends of the bristles extends slightly below a cylinder described by the perforated covers 38 of drum 32, as shown clearly in FIGURES 5 and 6. In this manner, as the rotor 86 and drum 32 rotate as described, the outer bristle ends poke or protrude through the perforations or openings of the covers 38. The exact manner in which the bristles function to clean the screen is not fully understood; however, in addition to this prodding of the material from out of the openings in the screen, the bristles also inherently sweep through the openings during their penetration. This occurs because the linear velocity, in the same direction as the direction of screen movement, of a point on each bristle which is contacted by the screen is a variable dependent upon (1) the location of this point of contact of the screen along the length of the bristle, that is, the location in from the end of the bristle where the bristle is contacted by the screen; (2) the relative peripheral speeds of the bristle and screen; (3) the length of the bristle; and (4) the amount of penetration of the bristle into the screen. This sweeping enables the bristles to clean a large area of each of the openings in the screen and, in some instances, to flex the screen to cause a loosening of the debris from the inside surface thereof. A bristle whose distal end might chance to come in contact with an individual string of the screen cover pushes the string to one side and hence even such a bristle end will ultimately protrude into a perforation of the covers 38.

Any debris or other matter that is clinging to the strings and overlying the perforations of the cover 38 are thus prodded or poked off the strings and out of the perforations radially inwardly into the interior of the drum 32. Further tossing of the debris within the drum 32 may ultimately result in its being broken into smaller particles that can then pass through the perforations and drop onto one or the other of the belts 58 or 59. In this manner the perforated covers are kept clean of debris that might clog the perforations of the cover.

It is to be noted that as the rotor 86 is rotated, the line of contact of any row of bristles 104 describes an imaginary spiraled (helical) band with the surface of the screen drum 32 since the bristle rows are in oblique relation to the axis of shaft 90. It is evident that at no time will it be possible for the distal ends of the bristles of an entire row of bristles be in contact with a longitudinal drum beam 36 (FIG. 5). It will be possible for the distal ends of only a small portion of the bristles of a row to contact a beam 36. Since the beams 36 are solid and have no perforations, the distal ends of the bristles that do contact a beam at any one time apply only a relatively small radially inwardly directed force to the beam. And, of course, the relatively stiff beam reacts against the bristles to impose an equal but opposite force to the bristles. However, these forces are of a magnitude that is not sufficient to distort and possibly, weaken, or damage the beams 36 or the rotors 88 and 89. In addition the forces mentioned are of a magnitude that can be readily withstood by the bearings 84, 85 and 87.

While the degree of twist or spiraling of the bristle rows of the rotors 88 and 89 is not critical, it should be preferably be less than an amount that would result in contact of portions of more than one bristle row with a single beam at the same time, and greater than an amount that would cause harmful bending of the beams 36 and the plates 92. It is further noted that there is no requirement that the number of bristle rows be restricted to the three shown in the figures, nor do the bristle rows need to be equally spaced circumferentially of the shaft 90.

It is important that the screen drum 32 and the screen cleaner 86 are rotated in the indicated directions and in synchronism with each other so that the peripheral speeds of the screen covers 38 and the distal ends of the bristles 104 are substantially equal to each other; as such, the distal ends of the bristles are not swept or brushed across the covers 38. Instead, the bristles ends merely move along with the cover 38 for a short circumferential distance and only poke or prod debris inward into the interior of the drum 32 as previously described.

It has been discovered that such non-brushing action results in far more effective and efficient removal of debris from the perforated covers 38 due to the fact that smearing of the relatively soft and wet vegetable matter of the debris, as would be the case if sweeping or brushing were utilized, is eliminated.

Even more efficient cleaning action has been discovered to take place when the peripheral speeds of the screen covers 38 and the distal ends of the bristles 104 differ from each other by up to five percent. In the preferred embodiment of the present invention, the cleaner 86 is rotated at a speed such that the peripheral speed of the distal ends of the bristles is five percent greater than the peripheral speed of the screen covers 38. In this situation, the distal ends of some of the bristles that enter into the perforations of the screen cover 38 move across the width of the perforations and tend to scrape or agitate debris from the opening without smearing the debris across the strings forming the opening. Since the screen is a flexible netting, the screen itself moves or is stretched slightly without damage in a direction generally tangential to the circumference of the drum in response to those bristle ends which are urged firmly against the strings while in the openings. It has also been discovered that the tangential stretching of the cover or netting 38 effects removal of debris from portions of the cover remote from actual contact of the brushes.

The up to five percent difference in peripheral speeds does not effect brushing or wiping action of the bristles 104 across the screen covers 38 and thus there is no chance that the debris be smeared further on the covers 38.

In order to cause the entire peripheral portion of the screen drum 32 ultimately to be contacted by distal ends of the bristles 104, it is necessary to provide that the rows of bristles do not always contact the same peripheral portions of the screen drum on each revolution of the drum. In other words, with each successive revolution of the drum the distal ends of the bristles of the rows should contact successively different peripheral portions of the drum. In this way, after repeated revolutions of the drum, every portion of the peripheral surface of the drum is eventually contacted by bristle ends.

The preferred manner in which to accomplish the scanning action, as described above, is to provide that the circumference of the screen drum 32 be different from an integral multiple of the circumferential spacing between two adjacent bristle rows of the cleaner 86. For example, the relationship between the circumference of the drum 32 and the circumferential spacing between two adjacent rows of the equally spaced rows may be that the drum circumference is equal to an integral multiple of the aforesaid adjacent row spacing plus or minus a distance equal to the circumferential width of a row. In this manner, upon successive revolutions of the drum, the drum will be contacted by distal ends of the bristles at areas immediately adjacent the previously contacted area.

The power drive train for operating the various previously described rotating parts of the viner will now be set forth in greater detail.

A source of power comprising an internal combustion gasoline engine 118 and a speed reducing transmission 120 is mounted on a mounting frame 122 at the forward end of the viner as shown in FIGURE 1. A power shaft 124 extends outwardly from the transmission and a pulley 126 is secured to the shaft 124. The forward end of the beater drive shaft 42 extends forwardly of the drum 32 and has a pulley 128 connected thereto. A flexible drive belt 130 is trained about the two pulleys 126 and 128. A driving sprocket 132 is secured to the rearward end of beater shaft 42. Two idling sprockets 134 and 136 mounted one above the other are rotatably secured to a support member 138 secured to the upper rear transverse beam 26 a short distance to the left of the end of shaft 42 as viewed in FIGURE 2.

Two bearings 140 and 142 are mounted on the top side of bracket 60 one at the forward end and the other at the rearward end. A longitudinally extending shaft 144 is journalled in bearings 140 and 142 and the rear end of shaft 144 extends rearwardly of the rear bearing 142. A sprocket 146 is secured to the rear portion of shaft 144 in line with sprocket 132. A chain 148 is trained about the sprockets 146 and idling sprockets 134, 136 so that a portion of the outer side of the chain 148 is in engagement with a portion of the sprocket 132.

Thus, when the engine 118 is running, power is transmitted through the transmission 120 to rotate the beater shaft 42 at a predetermined speed in a counterclockwise direction as viewed in FIGURE 2. By means of the interconnected sprockets 132 and 146, power is transmitted from the shaft 42 to the shaft 144 to rotate the last mentioned shaft at a predetermined speed in a clockwise direction as viewed in FIGURE 2.

A driving pulley 150 is journalled on the shaft 144, between the bearings 140 and 142, in fixed axial relationship but freely rotatable thereon. There is provided a clutch or coupling 152 of the well known jaw type basically comprised of a fixed jaw member 154 secured to the rear side of pulley 150 for rotation therewith, and a movable jaw member 156 having inner splines in engagement with axially extending splines on the shaft 144. The movable member 156 is thus continuously rotated with the shaft 144 and is movable axially thereon.

Jaws (not shown) formed on the movable member 156 engage with corresponding jaws formed on the fixed member 154 when the movable member is urged forwardly on the shaft 144 thereby causing the fixed member 154 and attached pulley 150 to be driven at the same angular speed as the shaft 144. A clutch actuating lever 158 is pivotally mounted on a pivot member 160 attached to one side of the upper portion of support member 20. The upper portion of the lever 158 is formed with a yoke 162 that engages the movable member 156. The lower end of the lever 158 is operated manually to selectively pivot the yoke 162 forwardly and rearwardly between positions respectively engaging and disengaging the movable member 156 with the fixed member 154 as desired.

Another important feature of the present invention is self adjustment of the screen cleaner into drum-disengaged position when it is desired to not utilize the screen cleaner.

When the lever 158 is operated to disengage the movable member 156 from fixed member 154 motive power is of course removed from the screen cleaner 86. If, at the time motive power is removed from the screen cleaner, some bristles of a row are protruding into perforations of the screen cover 38, the rotation of the drum will rotate the screen cleaner until the bristles of the row no longer are in the perforations. At that time further rotation of the screen cleaner will cease with the bristles out of contact with the screen 38 and there will be no interference from the bristles to continued rotation of the drum 32.

The rear portion of shaft 90 extends through and rearwardly of bearing 84. A pulley 164 is secured to the rearward end of the shaft 90 and in line with the pulley 150 that is rotatably mounted on shaft 124.

A flexible belt 166 is trained about the pulleys 150 and 164, and an idler roller mounted beneath the belt is spring biased against its lower run. Thus, when the lever 158 is actuated manually to cause the movable member 156 to engage with the fixed member 154, rotation of the shaft 144 will effect rotation of the screen cleaning means 86 in the clockwise direction at a predetermined speed according to the speed of the engine 118 and the relative sizes of the various sprockets and pulleys described above.

An apron driving sprocket 170 is secured to the shaft 144 between the pulley 150 and bearing 140. A driven sprocket 172 is secured to mounting shaft 174 of six-sided drum 49 and in line with driving sprocket 170. A chain 176 is trained about sprockets 170 and 172. A slack take-up mechanism 178 is mounted on the pivot arm 54. The slack take-up mechanism includes two rotatably mounted idler sprockets 180 and 182 so arranged and spring-biased as to maintain tension in the chain 176 as drum 49 is pivoted during operation. Rotation of shaft 144 causes continuous rotation of sprocket 170 and consequent rotation of drum 49 and belt 58 in the clockwise direction as indicated in FIGURE 2.

On the left side of the viner (as viewed in FIG. 2) a shaft 184 extending longitudinally the full length of the viner is rotatably mounted on mounting brackets 186 (only one of which is shown in FIG. 2). A plurality of pulleys 188 (only one of which is shown in FIG. 2) are secured to the shaft 184 in line with various ones of the circular support members 34 of the screen drum 32. Each in-line pair of pulleys 188 and circular member 34 has trained therearound a flexible belt 190 (two of which are illustrated in FIG. 1). A driven pulley 192 is secured to the rear end of shaft 184. Also secured to the rear end of beater drive shaft 42 is a driving pulley 194 disposed in line with driven pulley 192. A flexible belt 196 is trained about the pulleys 192 and 194. Hence, as beater shaft 42 revolves in the counterclockwise direction, the long shaft 184 is also driven in the counterclockwise direction thereby rotating the screen drum 32 in the counterclockwise direction. The sizes of the pulleys used to cause rotation of the drum 32 are of course chosen so that the drum 32 rotates in synchronism with the screen cleaning means 86 as described previously.

A driving pulley 198 is fixed to shaft 184 just forward of pulley 192. An idling pulley 200 is rotatably mounted on the bracket 186 just above and in line with pulley 198.

A driven pulley 202 is fixed to the rear end of shaft 204 of six-sided drum 57 in line with pulleys 198 and 200. A flexible belt 206 is trained about the pulleys 200 and 202 so that the outer surface of the belt is engaged with the pulley 198. Thus as the pulley 192 rotates in the counterclockwise direction, the drum 57 and belt 59 are driven in the clockwise direction.

There has thus been shown a cleaning means for a rotating perforated drum which cleaning means incorporates the important and novel features of a rotating member having skewed rows of relatively stiff but flexible bristles and the cleaning means being mounted for selective rotation exteriorily of the drum at a speed such that the ends of the bristles move along at the same peripheral speed as the surface of the drum so that the bristles poke debris from the perforations and do not smear debris across the perforations. Further, the selective rotation also provides for cessation of rotation of the bristles without interfering with continued rotation of the drum.

In one preferred embodiment of the present invention the screen drum 32 and screen cleaning means 86 were operated together continuously for approximately twenty-four hours with continuous effective removal of debris from the drum 32, while an identical viner not equipped with a screen cleaning means, such as cleaner 86, had to be halted every one-half to one hour in order manually to clean debris from the perforations of the drum 32.

Having completed a detailed description of a preferred embodiment of an invention, what I claim and desire to secure by Letters Patent is:

1. An apparatus for removing debris from the surface of a rotatable drum mounted on an agricultural machine, said apparatus comprising; a plurality of elongated sheet members, each of said sheet members being substantially identical to each other; each of said sheet members having a first pair of edges extending generally longitudinally of said sheet, and having a second pair of edges extending between said first pair of edges; said edges forming two pairs of diagonally opposed corners; each of said sheets being divided into two halves of substantially equal area; said halves being separated by a line extending between the corners of one pair of said pairs of diagonally opposed corners, a first one of said halves being disposed at an angle with respect to the other one of said halves, said sheet members being arranged so that one edge of the first pair of edges of each sheet is disposed parallel to the second edge of the first pair of edges of another of said sheets so as to form bristle receiving spaces; a plurality of generally slender relatively stiff bristles disposed within said bristle receiving spaces, each of said bristles having a distal end and a proximal end, the proximal ends of the bristles being disposed between the bristle receiving spaces and the distal ends of the bristles being spaced outwardly of said receiving spaces, said bristles extending generally perpendicular to the edges of said sheets between which their proximal ends are disposed; means for releasably drawing each of the parallel disposed first and second edges together for releasably securing said bristles in said dispositions, means for rotatably mounting said sheet members on said agricultural machine for interengagement between said bristles and said drum; means for rotating said drum and said sheet members; and means for selectively disengaging said rotating means from said sheet members.

2. In an agricultural harvesting machine for frangible produce, such as lentils or the like, including a drum mounted for rotation about its longitudinal axis and including a peripheral screen providing openings for passing the shelled lentils or the like, and means for rotating said drum in a predetermined angular direction about said axis, the improvement comprising; a rotor mounted for rotation about an axis extending alongside the outside of said screen and substantially parallel with the drum axis, the axis of said rotor being normally spaced a predetermined distance from said screen, means mounting circumferentially spaced rows of relatively stiff, radially extending, bristle-like elements on said rotor, said rows of elements extending generally longitudinally of said rotor, means for rotating said rotor in a direction counter to said predetermined angular direction so that the outer ends of said bristle-like elements are moved in a circular path at substantially the peripheral speed of said screen, the thickness of the bristle-like elements in each row, when measured at the mounting of the elements, being less than the corresponding dimension of the individual screen openings, said bristle-like elements being many times longer than their thickness in a row, the circular path of the outer ends of said bristle-like elements intersecting a portion of the peripheral surface of said screen so that said outer portions of said elements are brought into engagement with said screen during rotation.

3. An agricultural harvester comprising a rotary screen, means for rotating said screen, screen cleaning means comprising a rotor, means mounting said rotor on the harvester for rotation about an axis parallel to the axis of rotation of the rotary screen, a plurality of rows of bristles fastened to said rotor, said rows of bristles being circumferentially spaced around said rotor, said rows being arranged so that said bristles form a plurality of parallel curves around said rotor whereby an imaginary line drawn parallel to the axis of rotation of said rotor and in a cylindrical plane generated by rotating the bristles about the axis of rotation of said rotor will pass through only one of said rows at any one time, said rotor mounting means being arranged so that the cylindrical plane generated by said bristles intersects the periphery of said screen, means for rotating said rotor in a direction counter to the direction of rotation of said screen, said rows of bristles being arranged so that no bristle is touching said screen during at least one position of said rotor, and clutch means for disconnecting said rotor from said rotor rotating means.

References Cited
UNITED STATES PATENTS

| | | | |
|---|---|---|---|
| 352,228 | 11/1886 | Crosby | 209—390 |
| 2,651,799 | 9/1953 | Lombardi | 15—183 |
| 2,802,570 | 8/1957 | Rapp et al. | 209—390 |

FRANK W. LUTTER, *Primary Examiner.*

HARRY B. THORNTON, *Examiner.*

L. H. EATHERTON, *Assistant Examiner.*